United States Patent [19]

Hinckley

[11] Patent Number: 6,002,869
[45] Date of Patent: Dec. 14, 1999

[54] SYSTEM AND METHOD FOR AUTOMATICALLY TESTING SOFTWARE PROGRAMS

[75] Inventor: David N. Hinckley, Provo, Utah

[73] Assignee: Novell, Inc., Provo, Utah

[21] Appl. No.: 08/806,390

[22] Filed: Feb. 26, 1997

[51] Int. Cl.[6] .............................. G06F 11/00; G06F 15/20
[52] U.S. Cl. .............................. 395/704; 714/35; 714/38; 714/36; 395/701
[58] Field of Search ..................................... 395/701, 704, 395/183.13, 183.22, 183.08, 183.09, 682, 685; 702/108; 371/27.1; 324/73.1; 714/38, 35, 36

[56] References Cited

U.S. PATENT DOCUMENTS

| | | | |
|---|---|---|---|
| 5,021,997 | 6/1991 | Archie et al. | 714/31 |
| 5,059,127 | 10/1991 | Lewis et al. | 434/353 |
| 5,206,582 | 4/1993 | Ekstedt et al. | 324/73.1 |
| 5,357,452 | 10/1994 | Pio-di-Savoia et al. | 702/108 |
| 5,359,546 | 10/1994 | Hayes et al. | 702/123 |
| 5,500,941 | 3/1996 | Gil | 714/38 |
| 5,502,812 | 3/1996 | Leyre et al. | 714/10 |
| 5,513,315 | 4/1996 | Tierney et al. | 714/10 |
| 5,542,043 | 7/1996 | Cohen et al. | 702/108 |
| 5,634,098 | 5/1997 | Janniro et al. | 707/104 |
| 5,751,941 | 5/1998 | Hinds et al. | 706/53 |
| 5,754,760 | 5/1998 | Warfield | 714/35 |
| 5,758,062 | 5/1998 | McMahon et al. | 714/33 |

OTHER PUBLICATIONS

Ralph L. London and Daniel Craigen; "Program Verification"; *Encyclopedia of Computer Science*, Third Edition, 1993, pp. 1111–1114.

Richard A. DeMillo; "Software Testing"; *Encyclopedia of Computer Science*, Third Edition; 1993; pp. 1246–1248.

*Primary Examiner*—James P. Trammell
*Assistant Examiner*—Cuong H. Nguyen
*Attorney, Agent, or Firm*—Wolf, Greenfield, & Sacks, P.C.

[57] ABSTRACT

A test automation system for performing functional tests of a software program. The system includes a plurality of test functions each configured to test a discrete component of the software program. a user-defined test specification associated with the program provides state definitions that specify a desired test approach for each type of test procedure to be performed on the program. A test engine creates all test cases appropriate for a user-selected test type and controls the software program, applying the test functions and state definitions in accordance with the test specification. All test-specific and software program-specific data are located in the user-defined test functions and specifications while all generic test system processing resides in the test engine. The test specifications are preferably implemented in modifiable text files to maintain concurrency with an evolving software program. The test engine creates all possible permutations and combinations for performing a desired test. These test specification includes such items as the states that the software program may possess, the test functions required to transfer between one state and other possible states, information pertaining to the values that specific inputs may have, etc. During operation, the test engine generates test histories indicating the results of the test performed in accordance with one of the test specifications. The contents of the test histories include determination made by the test functions executed in accordance with an associated test specification.

21 Claims, 9 Drawing Sheets

FIG. 4

| 402 CURRENT STATE | 404 NEXT STATE | 406 PROP | 408 TEST FUNCTION | 410 FUNCTION ARGUMENT | 412 MIN VALUE | 414 MAX VALUE | 416 TEST MIN | 418 TEST MAX |
|---|---|---|---|---|---|---|---|---|
| INIT | INIT | | getServerEnvironment | | | | | |
| START | COMMON CONSOLE OPTIONS | CS | doNothing | | | | | |
| | LOADED | S | loadNLM | VRepair.NLM | | | | |
| COMMON CONSOLE OPTIONS | MOUNT OPTIONS | CS | doNothing | | | | | |
| | RETURN | S | doNothing | | | | | |
| | SET PARAMETERS | CS | doNothing | | | | | |
| LOADED | END | S | exitVRepair | | | | | |
| | SET VREPAIR OPTIONS | S | setVRepairOptions | | | | | |
| LOG ERRORS | COMMON CONSOLE OPTIONS | CS | doNothing | | | | | |
| | END | S | unloadNLM | VREPAIR.NLM | | | | |
| | REPAIR A VOLUME | S | escapeKey | | | | | |
| MOUNT OPTIONS | RETURN | S | dismountVolume | | | | | |
| | RETURN | S | mountVolume | | | | | |
| REPAIR A VOLUME | END | S | unloadNLM | VREPAIR.NLM | | | | |
| | LOG ERRORS | CS | logErrors | | | | | |
| | MOUNT OPTIONS | CS | doNothing | | | | | |
| | REPAIR A VOLUME | S | errorPause | | | | | |
| | REPAIR A VOLUME | S | noErrorPause | | | | | |
| | SET PARAMETERS | CS | doNothing | | | | | |
| | STOP VOLUME REPAIR | S | stopVolumeRepair | | | | | |
| REPAIRING VOLUME | END | S | unloadNLM | VREPAIR.NLM | | | | |
| | SET PARAMETERS | CS | doNothing | | | | | |
| REPAIRING VOLUME ARGUMENT | SET PARAMETERS | CS | doNothing | | | | | |
| | END | S | waitForVRepairToUnload | | | | | |
| SET PARAMETERS | RETURN | | readAheadEnabled | | ON | OFF | | |
| | RETURN | | setMaxDiskWrites | | 10 | 4000 | | |
| | RETURN | | setMiniFileCacheBuffers | | 20 | 100 | 20 | 100 |
| | RETURN | | setReadAheadLRU | | 0 | 3600 | 0 | |
| SET VREPAIR OPTIONS | END | S | unloadNLM | VREPAIR.NLM | | | | |
| STOP VOLUME REPAIR | END | S | unloadNLM | VREPAIR.NLM | | | | |
| | LOADED | S | continueStop | | | | | |
| | REPAIR A VOLUME | S | cancelStop | | | | | |
| | SET PARAMETERS | CS | doNothing | | | | | |

FIG. 5

```
                                                                    TEST SPECIFICATION FILE
 1  TEMPLATE P STATE NEXT_STATE FLAGS FUNCTION MIN MAX TESTMIN TESTMAX
 2
 3  P "INIT" "INIT" OR "getServerEnvironment"
 4
 5  P "START" "COMMON CONSOLE OPTIONS" "CS" "doNothing"
 6  P "START" "LOADED" "S" "loadNLM" "VRepair.NLM"
 7
 8  P "COMMON CONSOLE OPTIONS" "MOUNT OPTIONS" "CS" "doNothing"
 9  P "COMMON CONSOLE OPTIONS" "RETURN" "S" "doNothing"
10  P "COMMON CONSOLE OPTIONS" "SET PARAMETERS" "CS" "doNothing"
11
12  P "LOADED" "END" "S" "exitVRepair"
13  P "LOADED" "SET VREPAIR OPTIONS" "S" "setVRepairOptions"
14
15  P "LOG ERRORS" "COMMON CONSOLE OPTIONS" "CS" "doNothing"
16  P "LOG ERRORS" "END" "S" "unloadNLM" "VREPAIR.NLM"
17  P "LOG ERRORS" "REPAIR A VOLUME" "S" "escapeKey"
18
19  P "MOUNT OPTIONS" "RETURN" "S" "dismountVolume"
20  P "MOUNT OPTIONS" "RETURN" "S" "mountVolume"
21
22  P "REPAIR A VOLUME" "END" "S" "unloadNLM" "VREPAIR.NLM"
23  P "REPAIR A VOLUME" "LOG ERRORS" "S" "logErrors"
24  P "REPAIR A VOLUME" "MOUNT OPTIONS" "CS" "doNothing"
25  P "REPAIR A VOLUME" "REPAIR A VOLUME" "S" "errorPause"
26  P "REPAIR A VOLUME" "REPAIR A VOLUME" "S" "noErrorPause"
27  P "REPAIR A VOLUME" "SET PARAMETERS" "CS" "doNothing"
28  P "REPAIR A VOLUME" "STOP VOLUME REPAIR" "S" "stopVolumeRepair"
29
30  P "REPAIRING VOLUME" "END" "S" "unloadNLM" "VREPAIR.NLM"
31  P "REPAIRING VOLUME" "SET PARAMETERS" "CS" "doNothing"
32
33  P "REPAIRING VOLUME ARGUMENT" "SET PARAMETERS" "CS" "doNothing"
34  P "REPAIRING VOLUME ARGUMENT" "END" "S" "waitForVRepairToUnload"
35
36  P "SET PARAMETERS" "RETURN" "" "readAheadEnabled" "ON" "OFF"
37  P "SET PARAMETERS" "RETURN" "" "setMaxDiskWrites" "10" "4000"
38  P "SET PARAMETERS" "RETURN" "" "setMinFileCacheBuffers" "20" "100" "20" "100"
39  P "SET PARAMETERS" "RETURN" "" "setReadAheadLRU" "0" "3600" "0"
40
41  P "SET VREPAIR OPTIONS" "END" "S" "unloadNLM" "VREPAIR.NLM"
42
43  P "STOP VOLUME REPAIR" "END" "S" "unloadNLM" "VREPAIR.NLM"
44  P "STOP VOLUME REPAIR" "LOADED" "S" "continueStop"
45  P "STOP VOLUME REPAIR" "REPAIR A VOLUME" "S" "cancelStop"
46  P "STOP VOLUME REPAIR" "SET PARAMETERS" "CS" "doNothing"
```

FIG. 6

```
                                                         ┌─ 600
                                        ─ ─ ─ ─ ─ ─ ─ ─ ─ ┘
┌─ ─ ─ ─ ─ ─ ─ ─ ─ ─ ─ ─ ─ ─ ─ ─ ─ ─ ─ ─ ─ ─ ─ ─ ─ ─ ─ ─ ┐
                                          TEST HISTORY FILE
  1  TEMPLATE ELAPSED_TIME NEXT_STATE FUNCTION VALUE
  2
  3  E "0" "START"
  4  E "8.073024" "COMMON CONSOLE OPTIONS" "doNothing" "NONE"
  5  E "29.089779" "SET PARAMETERS" "doNothing" "NONE"
  6  E "54.904705" "RETURN" "setMaxDiskWrites" "27"
  7  E "86.112215" "RETURN" "doNothing" "NONE"
  8  E "122.693375" "LOADED" "loadNLM" "VRepair.NLM"
  9  E "164.635656" "END" "exitVRepair" "NONE"
└─ ─ ─ ─ ─ ─ ─ ─ ─ ─ ─ ─ ─ ─ ─ ─ ─ ─ ─ ─ ─ ─ ─ ─ ─ ─ ─ ─ ┘
```

FIG. 7

```
                                                              TEST FUNCTION
1   int unloadNLM (const char*const NLM)
2   /*
3       PRE: NLM must be the full name of the NLM. getConsolePrompt must have been
4       called
5       POST: unloads NLM and waits until completely unloading before
6       continuing.
7   */
8   {
9       char  unloadCommand[MAX_COMMAND+1]  = "unload";
10      char  unloaded[MAX_COMMAND+1]       = "Module";
11      int   returnValue                   = FAILED_TEST;
12
13      tempNCErrorMode(ABORT_ON_ERROR);
14
15      strCatWithErrorCheck(NLM, MAX_COMMAND, unloadCommand);
16      (void) ncSwitchScreen((char*) SYSTEM_CONSOLE);
17      (void) ncEnter((char*) CLR_SCREEN);
18      (void) ncEnter(unloadCommand);
19
20      appendUpperCase(NLM, MAX_COMMAND, unloaded);
21      strCatWithErrorCheck("unloaded", MAX_COMMAND, unloaded);
22      waitForConsolePrompt();
23      delay(UPDATE_SCREEN_DELAY);
24      if
25      (
26          (ncScreenContainsString(unloaded) == TRUE) &&
27          (ncScreenAndNLMExist(NULL, (char*)NLM) == FALSE)
28      )
29      {
30          returnValue = SUCCESSFULL_TEST;
31      }
32      else
33      {
34          errorState.logError();
35          ncLogError("Error unloading %s", NLM);
36      }
37
38      return(returnValue);
39  }
```

SYSTEM AND METHOD FOR AUTOMATICALLY TESTING SOFTWARE PROGRAMS

BACKGROUND OF THE INVENTION

1. Field of the Invention

The present invention relates generally to software verification and, more particularly, to the automated testing of software.

2. Related Art

Newly developed software programs must be thoroughly tested in order to eliminate as many "bugs" or errors as possible before the software is released for widespread public use. Several different methods for testing software programs have been developed. One conventional approach, generally referred to as beta testing, involves distributing the program, typically under a non-disclosure agreement, to a group of users who use the program for a period of time and report any errors which are encountered to the software developer. Although this type of testing is commonly used in the software industry, it is often found to be very time consuming, adversely affecting the scheduled release of products incorporating the software program. In addition, beta testing can be extremely difficult to control, particularly when a large number of users are provided the beta version of the software. Furthermore, due to the non-systematic use of the program, there is no guarantee that every error, or even most errors, will be identified with this approach, even under circumstances where a large number of users are using the software.

Another conventional method for verifying and testing software programs involves the use of automated software testing techniques alone or in combination with beta testing. Automatic testing generally consists of dynamically verifying that a program is consistent with a detailed specification of its behavior. Automatic test techniques generally include what is commonly referred to as basis path test and range test techniques. Basis path testing involves determining the possible paths which the software program may follow. A path is a sequential list of program state transitions. The state transitions are executed to verify specific paths through the program. Range testing involves verifying that the program can successfully perform certain functions that depend upon inputs to the program. The software is repeatedly executed while the inputs are set to one or more values within a specified range. The values can be numerical ranges or other ranges such as string lengths.

A drawback to conventional automated software testing techniques include performing path testing randomly or on only certain paths which are likely to be executed during typical program operations. Likewise, conventional automated range testing techniques often test a limited number of numerical values within and outside of the specified range of a given input. These approaches to testing software are often based upon a cost/benefit analysis: the cost associated with test and verification as compared with the probability that more extensive testing will uncover errors that would be problematic for the end user. This risk analysis results in the incomplete testing of the software program, particularly as the cost for the manual creation and subsequent maintenance of test procedures for each software program increases.

Typically, conventional automated software test techniques include the development of multiple test procedures, each directed towards the verification of a particular software program. A drawback to these test systems is that the software programs are often a collection of modules, subroutines or other components that perform smaller or simpler subtasks. Oftentimes, these smaller functional programming components are also included in, called or referenced by other, larger programs as well. As a result, procedures for verifying these common features are often found in the multiple test procedures. There are a number of drawbacks resulting from this redundancy. First, improvements made to one test procedure must often be incorporated into other test procedures as well, further increasing the cost of maintaining the automated test system. Such changes may be due to, for example, modifications resulting from prior software testing, specification changes, etc. Under such conditions, test procedures become invalid and unusable until the modifications are completed. This interdependency of test procedures overburdens the software test process, extending the time required to release a new software product.

Another drawback to conventional software test techniques is that they are directed towards the coverage of internal components or elements associated with the software, such as statements, branches or dataflow chains. Creation of such test procedures generally requires access to the source code of the software program. However, such access is not always possible because the program source code is frequently subject to copyright or trade secret protection. In addition, such software test techniques require an intimate knowledge of the software program, oftentimes requiring the software developers themselves to create the test procedures. This prevents the assignment of such tasks to less costly and more available personnel. Also, the testing of the internal components or elements may be unnecessary, and therefore wasteful. This is because there are many more possible paths to test of the internal components than necessary to insure that the functional requirements are satisfied.

What is needed, therefore, is a system and method for thoroughly and efficiently testing software programs. The system should be capable of being easily and quickly modified to accommodate changes in the software program. The system should include the ability to automatically determine the requisite tests necessary to meet user-specified criteria. Furthermore, such an automated test system should test software according to its external characteristics and functional specifications and not require access to, or an intimate knowledge of, the software program.

SUMMARY OF THE INVENTION

The present invention is a test automation system for automatically performing functional tests of predetermined components of a software program. The test automation system includes user-defined test functions configured to test discrete components of the software program. A user-defined test specification associated with the software program provides test parameters that specify a desired test approach for one or more types of tests that may be performed. A test engine creates all test cases appropriate for a user-selected test type and controls the software program, applying the test functions and test parameters in accordance with the test specification.

Advantageously, the implementation of multiple test functions, each testing a discrete component of the program, eliminates redundant test procedures, thereby minimizing the extent to which test system modifications must be made to accommodate changes in the software program. This also significantly reduces the time required to perform repeated tests during the development of the software program.

Another advantage of the above arrangement is that all test-specific and software program-specific data and procedures are located in the user-defined test functions and test specifications while all generic test-related processing resides in the test engine. As a result, the test engine does not need to be modified to perform different tests on the same program or to perform the same tests on different programs. Thus, to test a new software program, test functions for only those discrete components that have not been previously tested, along with the test specification to perform the desired test procedures, need to be generated. This reduces the time and effort associated with creating new test procedures, as well as the time associated with modifying existing test procedures to accommodate changes in the software program.

Significantly, the software program may be sufficiently tested with the user-defined test functions and test specifications configured to functionally test the software program based upon its external characteristics and functional requirements. Advantageously, this provides for a simple test creation process, isolating the testing software from the intricacies of the program's structure, statements, etc. Furthermore, access to the source code is not required for test creation, enabling the test procedures to be created by those not intimately involved with the implementation details of the software program. It is also noteworthy that this enables test procedures to be developed for software programs for which the source code is subject to copyright and/or trade secret protection or is otherwise unavailable.

Preferably, the user-defined test specifications are implemented in text files accessible by the test engine. This enables the operator to easily create the test specifications using a standard text editor. Importantly, this also provides for the expedited modification of the test specification to maintain concurrency with an evolving software program. The test specifications include state definitions which provide the parametric boundaries within which the test engine creates all possible permutations and combinations for performing a desired test procedure. These state definitions include such items as states that the software program may possess, test functions required to transfer between one state and other possible states, and specified and desired ranges of numerical or textual values that specific program inputs may have.

The test engine generates test histories indicating the results of the test procedure performed in accordance with a test specification. The contents of the test histories include the state transitions that occurred during the test procedure and pass/fail determinations made by the implemented test functions that caused the state transition to occur. Significantly, the test histories are in the same format as the test specifications, i.e., ASCII files. This enables the test history files to be easily used by the test engine to repeat previously-performed test procedures. In addition, the test engine may provide the test results to the user through a display or other user interface.

Specifically, the test engine includes a test case generator that determines all possible state transitions that the software program may take based upon the state definitions provided in the user-created test specification. Each sequence or path of state transitions taken by the software program based on the test specification is referred to as a test case. A test function executor, responsive to the test case generator, applies the user-created test functions to the software program. During test operations, the test case generator instructs the test function executor to execute a specific test function at a specific time to advance the software program from the one state to the next. Upon executing each of the test functions, the test function executor informs the test case generator whether or not the software successfully executed the intended state transition.

For each current state, the test case generator transfers the current state, a selected next state and a corresponding test function that advances the software between the current and next states to a test history generator. The test history generator creates a test history file containing this and other information pertaining to the performance of the test procedure. Preferably, a separate test history file is created for each test case performed. As noted, the test case generator may utilize these test history files in place of the test specifications to repeat previously-executed tests.

An automation driver of the test engine receives, through a user interface, instructions regarding whether a test should be performed in accordance with a test specification or a test history file. In addition, the user-created instructions include time intervals in which the test case generator is to advance the software program from state to state, and other test criteria.

During operations, the test case generator creates potentially numerous test cases based upon the state definitions provided in a test specification file. Each state definition includes a transition between a current and a next state of the software program and the test function which is to be executed to invoke the transition. Using the state definitions and ranges or sets of possible numerical or textual values included in the test specification files, the test engine executes a predetermined test function, causing the software program to perform the state transition. The success or failure of the state transition is written to a test history file, preferably before each state transition is implemented. After the state transition occurs, an elapsed time to effect the transition is also recorded in the test history file.

Further features and advantages of the present invention, as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 4 is a table illustrating an exemplary test specification utilized by the test automation system of the present invention;

FIG. 5 is a listing illustrating the contents of the exemplary test specification shown in FIG. 4 implemented in a test specification file in accordance with a preferred embodiment of the present invention;

FIG. 6 is a listing illustrating the contents of the exemplary test history file in accordance with a preferred embodiment of the present invention;

FIG. 7 is a source code listing of an exemplary test function identified in the test specification table shown in FIG. 5 for operating on the software under test in accordance with the present invention;

DETAILED DESCRIPTION

I. Environment

Figure 1:
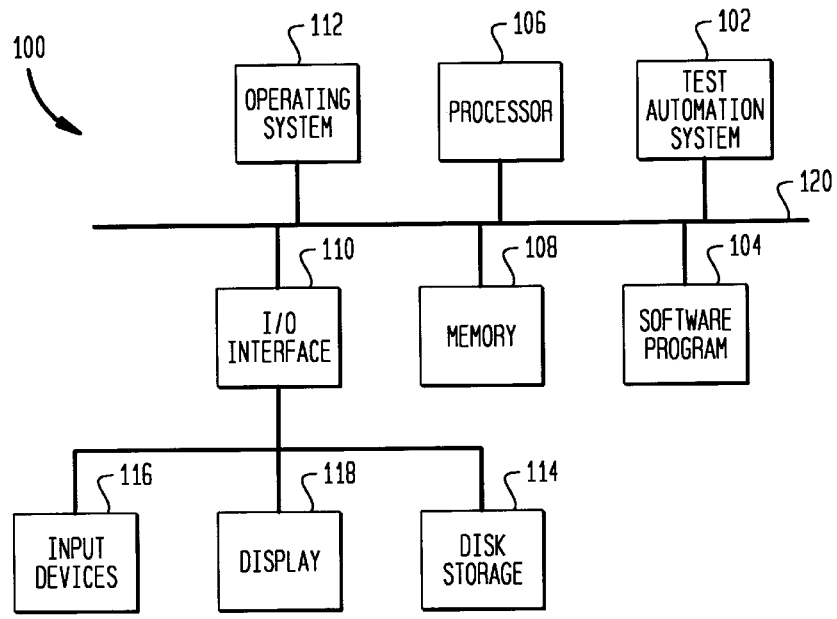
FIG. 1 is a block diagram of a computer-based system capable of implementing the test automation system in accordance with the present invention.

FIG. 1 is a block diagram of an exemplary computer-based system 100 suitable for implementing the test automation system 102 of the present invention. The test automation system 102 provides a user-controlled environment for testing software program 104, extensively and efficiently throughout the evolution of the software development process.

The computer system 100 may be a general purpose computer system, which is programmable using a high level computer programming language. The computer system 100 may also be implemented using specially programmed, special purpose hardware. The computer system 100 includes a processor 106, a memory unit 108, an input/output (I/O) interface 110 for interfacing with a disk storage unit 114, one or more input devices 116 and display 118. The disk storage unit 114 is typically implemented using one or more hard disk drives. The memory 114 is used for storage of program instructions and for storage of results of calculations performed by the processor 106. In a preferred embodiment, the memory 114 includes random access memory (RAM). The input devices 116 may be implemented using a standard keyboard and a pointing device, such as a mouse or trackball.

In the general purpose computer system 100, the processor 106 is typically a commercially available processor, such as the Pentium microprocessor from Intel Corporation, PowerPC microprocessor, SPARC processor, PA-RISC processor or 68000 series microprocessor. Many other processors are also available. Such a processor usually executes a program referred to as an operating system 112, such as the various versions of the Windows and DOS operating systems from Microsoft Corporation, the NetWare operating system available from Novell, Inc., or the Unix operating system available from many vendors such as Sun Microsystems, Inc., Hewlett-Packard and AT&T. The operating system 112 controls the execution of other computer programs such as the test automation system 102 and the software program 104, and provides scheduling, debugging, input-output control, accounting compilation, storage assignment, data management, memory management, and communication control and related services. The processor 106 and operating system 112 define a computer platform for which application programs in high level programming languages are written. The functional elements of the computer system 100 communicate with each other via bus 120.

The software routines for performing software program testing in accordance with the invention typically reside in memory 108 and/or disk storage unit 114, and may be stored on a computer-readable medium such as, for example, magnetic disk, compact disc or magnetic tape and may be loaded into the computer system 100 using an appropriate peripheral device as known in the art.

Preferably, the test automation system 102 is implemented in any well-known programming language such as C or C++. Those skilled in the art will appreciate that different implementations, including different function names, programming languages, data structures, and/or algorithms may also be used in embodiments of the present invention other than those described below.

It should be understood that the invention is not limited to a particular computer platform, particular operating system, particular processor, or particular high level programming language, and that the hardware components identified above are given by way of example only. In one preferred embodiment, processor 106, memory unit 108 and test automation system 102 are provided in a network server. The functions and operations of such an server are considered to be well known in the art.

II. System Overview

Figure 2:
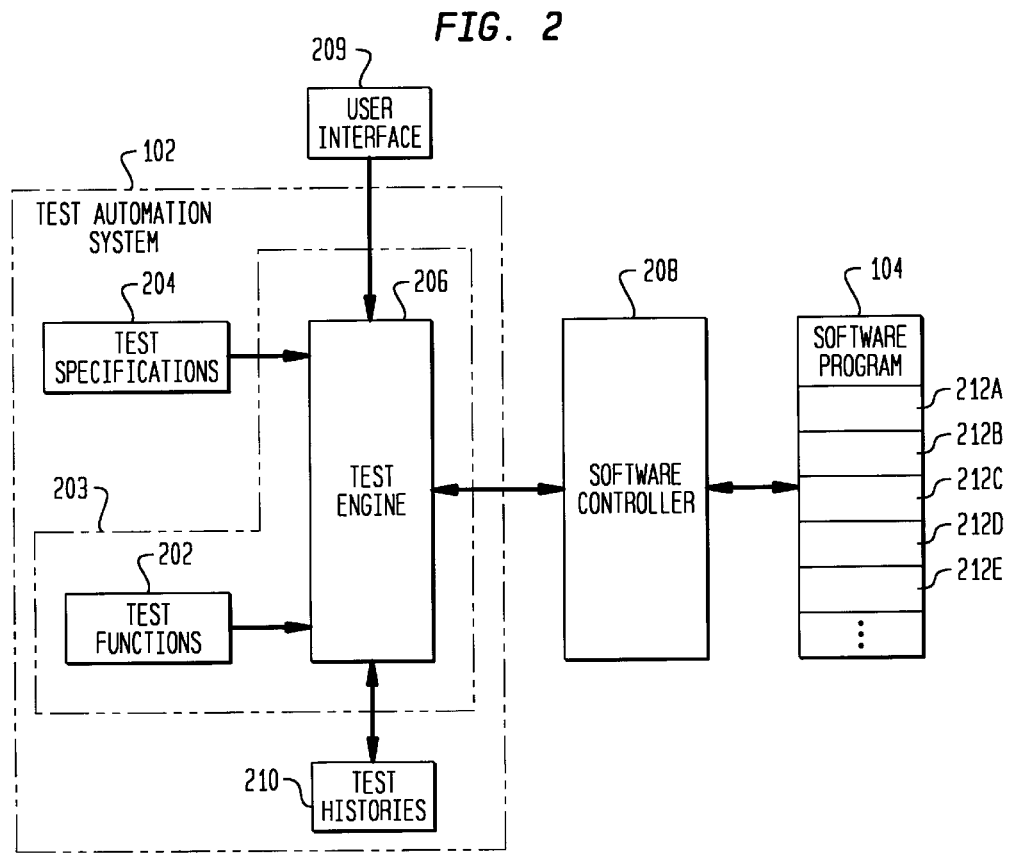
FIG. 2 is an architectural block diagram of a preferred embodiment of the test automation system of the present invention.

An architectural block diagram of one embodiment of the test automation system 102 of the present invention is shown in FIG. 2. The test automation system 102 provides a user-controlled test environment and performs automatically-generated functional tests of the software program 104 in accordance with user-generated instructions and specifications.

The test automation system 102 includes test functions 202 configured to test discrete functional components of the software program 104. A user-defined test specification 204 provides state definitions for performing one or more types of test procedures on the associated software program 104 using the test functions 202. A test engine 206 creates all possible and desired test cases appropriate for a user-selected test type, and applies the test functions 202 to the software program 104 in accordance with the test specification 204. The test engine 206 generates test history files 210 containing information pertaining to the test procedures performed on the software program 104 and the results of those tests. A commercially available software controller 208 is utilized to control the synchronized execution of the test automation system 102 and the software program 104.

As noted, the user, by means of user interface 209, specifies the type of test that is to be performed by the test automation system 102. The test engine 206 will execute the selected test based upon the state definitions in the test specification 204. In one preferred embodiment of the present invention, the test automation system 102 performs systematic basis path and range testing. In another preferred embodiment of the invention, the test automation system 102 also performs random path testing. In still another embodiment, the test automation system 102 performs test function testing. Often, test functions have errors. It is therefore preferably to test the test functions 202 before utilizing them in a long test procedure. This testing involves using all of the test functions 202 at least once before doing actual testing. In this embodiment, the test engine 206 determines the path or paths necessary to test all of the test functions 202. The test automation system 102 is described below with reference to these specific test types. However, as one skilled in the relevant art would find apparent, other types of software tests now or later developed may be performed by the test automation system 102 of the present invention. These and other types of software test and verification techniques are considered to be well known in the art. What is new is the architecture, methodology and approach of the test automation system 102 for creating and executing software tests procedures.

Briefly, basis path testing involves the verification that a software program successfully transitions through various states during its execution. A state is commonly known to be a description of a condition of the software program. Range testing involves verifying that the program can successfully perform certain functions that are dependent upon inputs to the program. Range testing controls these inputs, setting them to one or more values within a specified range or set for that input. As will be described in detail below, the test automation system 102, in contrast with conventional systems, automatically determines all possible test cases, or paths, including all possible paths through the software program 104 for basis path testing and all possible and desired values within and near the specified range of values or items in a set for range testing.

As is known in the art, software programs such as the software program 104 are generally a collection of many discrete components 212A–212E (generally and collectively referred to as components 212), each performing a particular function that contributes to the overall function of the larger software program 104. As noted, conventional software test techniques are directed towards completely verifying each such software program 104. The resulting redundancy in test procedures due to common functional components 212 requires modifications associated with one such discrete component to be made to each of the individual test procedures, and causes these procedures to become dated until such updates are implemented.

In accordance with the present invention, the test automation system 102 includes multiple test functions 202, each configured to test one of the discrete components 212 of the software program 104. As applied to a particular software program 104, each of the test functions 202 is configured to advance the software program 104 from a current state to one next possible state. This division of the definition of the software program 104 eliminates redundant test procedures, thereby minimizing the extent to which test automation system modifications must be made to accommodate changes in the software program 104. This significantly reduces the time required to perform repeated tests during the evolution of the software program.

Significantly, the test functions 202 extensively tests the software 104 according to its external characteristics and functional specifications. For example, a test function 202 may be a test procedure to verify that the software program can properly perform the function "select a menu item." Thus, the present invention enables one that does not have an intimate knowledge of the software program to create test procedures in accordance with the present invention. The present invention verifies the software program 104 by testing its functionally-discrete components 212, making it simple and less costly to maintain.

Furthermore, each test specification 204 is associated with one of the software programs 104 to be tested. As noted, the test specification 204 is user-defined and provides the state definitions pertinent for performing certain test procedures on an associated software program 104. As will be described in detail below, in one preferred embodiment, the test specification 204 includes a representation of a state diagram of the software program 104, including the states that the program may possess and the states that the program may transition to from each of these states. Associated with each state transition, the test specification 204 also identifies the test function 202 that will invoke the associated transition in the software program 104. In another aspect of the invention, the test specification 204 also includes specified and desired ranges of numerical values or items to choose from a set for specific program inputs. In still another aspect of the invention, the test specification 204 includes other types of test parameters appropriate for performing a desired type of test procedure. It should also be noted that there may be multiple test specifications 204 associated with a program 104. For example, each of the multiple test specifications 204 may be configured to test a different portion of the software program 104 or to test the software program 104 in a different manner. It should be noted that by dividing the test specification 204, multiple computer systems 100 can simultaneously test several copies of the software program 104, greatly reducing the time to test the program 104.

Preferably, all test-specific and software program-specific data and procedures are included in the test function 202 and text specification 204, while the test engine 206 comprises generic test procedures common to all test procedures and software programs. This, with the separation of the test specifications 204 from the test engine 206, enables the user to create and modify the test specifications 204 quickly and without the need to modify the test engine 206.

The test engine 206 generates test histories 210 indicating the results of the test procedure performed in accordance with a test specification 204. The contents of the test histories 210 include a state transition made during the test procedure as well as pass/fail determinations made by the test functions 202 that caused the state transitions to occur. Significantly, the test histories 210 contain similar information as the test specifications 204 and are preferably in the same format as the test specifications 204. This enables the test histories 210 to be used by the test engine 206 to repeat previously-performed tests procedures. For example, the user may repeat test procedures that detected errors after correcting those errors to insure that the errors have been properly corrected.

Figure 3:
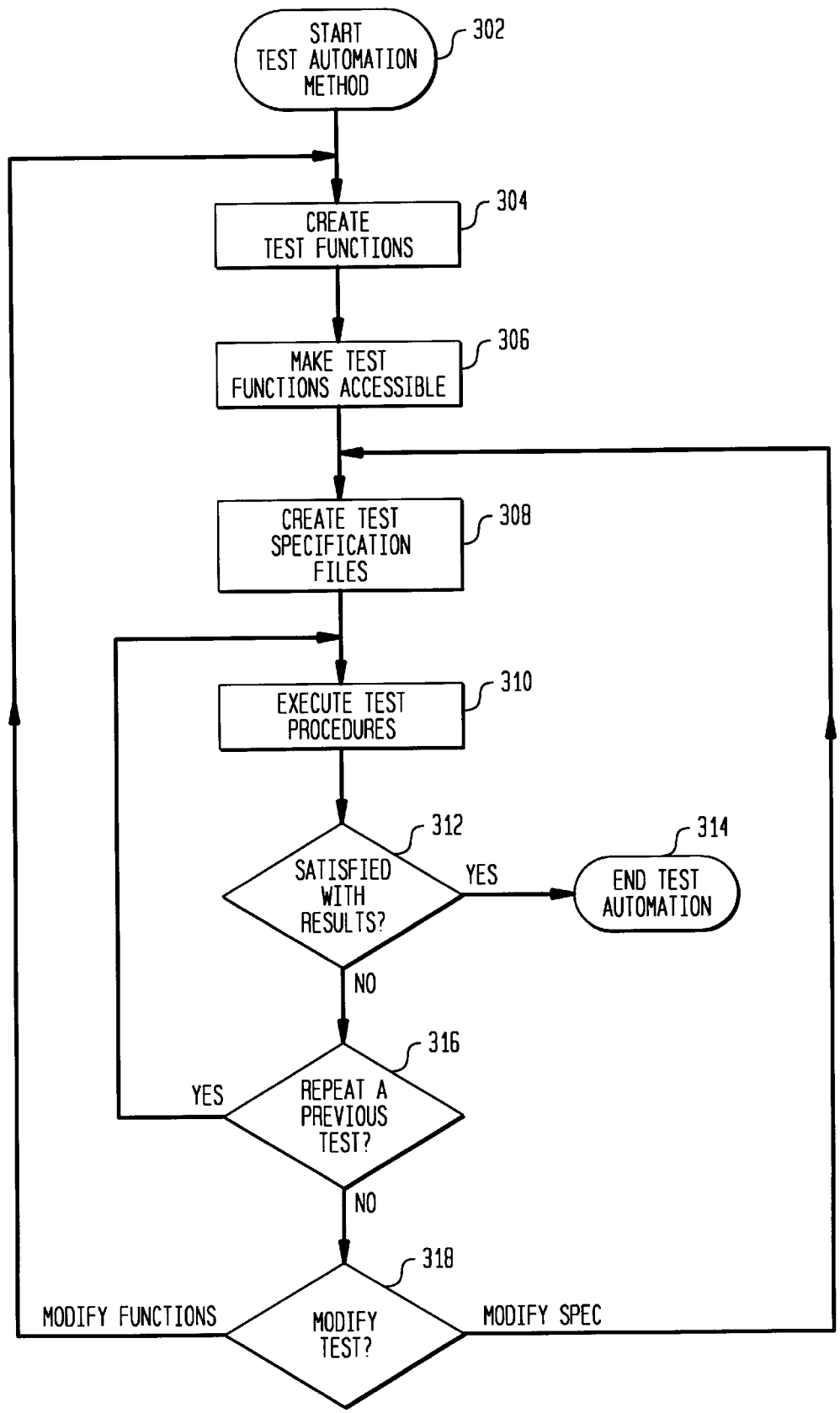
FIG. 3 is a flow diagram illustrating the functions performed in the creation and execution of a software test utilizing the test automation system in accordance with the present invention.

FIG. 3 is a flow diagram illustrating the functions performed in the creation and execution of a software test procedure utilizing the test automation system 102 of the present invention. After start block 302, the user/operator creates one or more test functions 202 for functionally verifying portions of the program 104 at block 304. As noted, since each test function 202 tests specific discrete components 212 of the software program 104, certain test functions 202 may already exist to test similar discrete components 212 in other software programs 104.

At block 306, the test functions 202 are made accessible to the test engine 206. Preferably, the test functions 202 are compiled with the test engine 206 to produce a single software executable as illustrated by the dashed box 203 in FIG. 2. Alternative approaches for enabling the test engine 206 to select and control the execution of the test functions 202 are also contemplated.

The test specifications 204 are created by the user at block 308. In one preferred embodiment, the test specifications are text (ASCII) files, and are preferably stored in local memory 108, accessible to the test engine 206. The test engine 206 determines, based on instructions from the user/operator, which basis path tests, range tests, and random path and range tests to execute. When this user-selected test is executed at block 310, the test specification 204 associated with the selected test and software program 104 is used to determine which of the test functions 202 to execute to advance the software from one state to a next state, and what values are to be assigned to inputs to the software program 104 during these state transitions.

Each of the states in the test specification file 204 are implemented through the execution of the associated test function 202 until the test procedure is completed or until an error occurs. If the user determines at block 312 that the results are satisfactory (e.g., no errors were identified), then the test procedure is completed at block 314. However, if the user is not satisfied with the results of the test at block 312, then the user is provided with the option of repeating the test to, for example, isolate the cause of the error.

If the user decides to repeat the previous test at block 316, then processing is repeated at block 310 wherein the previous test procedure is executed. When executing a previous test procedure stored in a test history file 210, the previously applied test functions are executed to advance the software program 104 in an identical manner as was done in the original test. Alternatively, the user may determine at block 318 that modifications to the test specification 204 is required before executing the test procedure again. This would be done, for example, when the test engine 206 generates errors caused by an invalid state definition rather than errors in the software program 104.

Alternatively, at block 318 the user may determine that the test functions 202 which were executed in the previous test are to be modified or that more test functions should be created. Processing is repeated at block 304 wherein test functions 202 may be edited or created.

III. System Specifics

A. Test Specification

An exemplary test specification 204 is illustrated in FIG. 4. A corresponding test specification file 500 is illustrated in FIG. 5. The exemplary test specification 400 is illustrated in a tabular form that is analogous to a preferred text file format shown in FIG. 5. This test specification is configured to test a volume repair utility.

Column 402, Current State, contains all the states through which the software program 104 is to possess during the performance of the desired test procedure defined by the test specification table 400. In the exemplary test specification table 400, the Current States 402 include, for example, an initialization state (INIT), a start state (START), etc.

Column 404, Next State, identifies, for each Current State 402, the possible states that the software program 104 may next possess. For example, COMMON CONSOLE OPTIONS and LOADED are the Next States that the software program 104 may possess after a Current State 402 of START. In one aspect of the present invention, the test specification table 400 identifies all possible Next States. This enables the test engine 206 to determine all possible paths through the program 104. In another aspect of the invention, the user/operator may identify only certain Next States 404 to, for example, limit the test process to verify specific functionality.

Column 406, Prop, identifies the properties for an associated state transition. One of the properties, for example, is whether the Current State 402 is to be returned to at a later point in the test procedure, which may be desired when only certain paths through the software program 104 occur. The Current State is to be temporarily added to a call stack (not shown) or otherwise retained to enable the test engine 206 to return to it at a later point during the test procedure. To return to the last state placed in the call stack, the Next State 404 is set to RETURN. In the illustrative example, after the START Current State 402, COMMON CONSOLE OPTIONS is the Next State 404 and the START state is loaded into the call stack due to the indicated callable property 406. From the COMMON CONSOLE OPTIONS state the software program 104 transitions to the MOUNT OPTIONS state and the COMMON CONSOLE OPTIONS state is loaded into the call stack due to the indicated callable property 406. From the MOUNT OPTIONS state, the RETURN next state returns the software program to the last-entered state in the call stack, namely COMMON CONSOLE OPTIONS. From this state, the Next State 404 is also RETURN, which brings the software program 104 to the previous state in the call stack, namely the START state This provides the user/operator with significant flexibility in defining the test procedure contained in the test specification.

Another property identified in the Prop column 406 indicates whether the Test Function 408 associated with the Next State 404 is a safe ("S") or destructive (0) test function. A safe test function will not cause loss of data to the software program 104 or other programs in the environment. Destructive tests may be, for example, tests which delete file information or which are executed purposely to destroy data in order to test data recovery functions. The user/operator is provided with the capability, through the user interface 209, to select whether the destructive portions of a test specification 204 will be performed when it is executed by the test engine 206.

In addition to the RETURN state, other states have specific, predetermined functions to assist in providing flexibility to the user/operator. For example, in the illustrative embodiment, the INIT state is executed only once at the beginning of the test procedure. This state is used to establish the environment for the software program 104. Also, the START state is always the first state after the INIT state. When the END state becomes the Next State 404, the current path or test case is completed. If testing continues after an END state, it will continue with a START state to start the verification of a new path through the program 104.

Column 408, Test Function, identifies the test function 202 that, when executed, causes the software program 104 to advance from the Current State 402 to the associated Next State 404. Alternatively, the Test Function 408 also identifies test functions 202 that set parameters to a desired value or range of values. For example, the second Test Function 408 associated with the Current State 402 SET PARAMETERS, is setMaxDiskWrites, which sets the upper threshold on the number of disk writes that may occur. The values of this parameter are discussed below.

Column 410, Function Argument, identifies the arguments to the associated test function 202 identified in the Test Function column 408. For example, the "loadNLM" test function advances the software program 104 from the START state 402 to the LOADED state 404. This test function requires an argument, VREPAIR.NLM, to properly execute.

Min Value and Max Value columns 412 and 414 contain the minimum and maximum values, respectively, that the associated parameter identified through the Test Function 408 name, may have. The Test Min and Test Max Values 416 and 418 contain the range of values of the parameters which are to be tested when the test specification is executed. If column 418 contains no value then there is no maximum limit on the value to test. Likewise, if column 416 contains no value then there is no minimum limit on the value to test.

If the value chosen by the test engine 206 is out of the range of Min and Max Values 412 and 414, then the test function 202 tests for error correction of invalid data. The value type of the Min and Max Values 412, 414 depends upon the type of test function 202 and is defined in the associated test function 202. As noted, the test engine 206 will test values surrounding the numerical boundaries identified in the Min Value and Max Value columns 412 and 414. This includes the testing of the indicated maximum and minimum values, as well as values immediately above and below these threshold values. Preferably, Test Min and Test Max Values 416, 418 are also provided to enable the user to specify sub-ranges or values to be tested.

Min and Max Values 412, 414 and Test Min and Test Max Values 416, 418 can also contain items to test in a set. An example of Min and Max Values 412 and 414 used to hold items in a set is the first Next State 404 of SET PARAMETERS Current State 402. These items are "ON" and "OFF". The test engine 206 will use the values "ON" and "OFF" as two separate tests.

Referring to FIG. 5, the exemplary test specification file 500 corresponding to the test specification table 400 is shown with line numbers for ease of reference. The file 500 is a portion of a larger test specification and is provided for illustration purposes only. Preferably, the user-defined test specifications 204 are implemented in ASCII files accessible to the test engine 206. This enables the operator to easily create the test specifications 204 using a standard text editor. Importantly, this also provides for the expedited modification of the test specification 204 to maintain concurrency with an evolving software program 104. In the exemplary embodiment, the test specification file 500 is a series of delimited records, each having adjacent fields separated by quotation marks.

The test specification file header shown on line 1 defines the fields for the records contained in the exemplary test specification file 500. As shown, the fields are in the same sequential order as the columns in the test specification table 400. Since test functions 202 that set parameters have max and min values rather than arguments, the Function Argument column 410 and Min Value column 512 are combined in a single field in the illustrative embodiment. In should be noted, however, that other test specification file formats appropriate for a particular test engine 206 and test procedure may be used.

B. Test History

FIG. 6 illustrates an exemplary test history file 600. The test history file 600 is illustrated with line numbers for ease of reference. Preferably, the test history files 210 are formatted in a manner similar to the test specification files 204. Accordingly, in the illustrative example shown in FIG. 6, the test history file 600 has a series of delimited records analogous to the test records in the test specification file 500.

The test history file 600 is described with reference to both the test specification file 500 with the test history file 600. A test history record is created for each state transition as defined by the test specification file 500. The resulting series of records identifies the path through the software program 104 taken during the execution of the particular test procedure specified in the test specification file 500.

As shown, the test history file 600 includes, for each state transition, the time from the beginning of the test that the state transition occurred (Elapsed Time). It also includes the Next State, the Test Function, and the argument or value (Value), all of which are defined with respect to the test specification file 500. For example, at time 0, the test procedure began and transitioned to the START state. At 8.073024 microseconds, the program 104 transitioned to the COMMON CONSOLE OPTIONS state at line 9 of the test specification file 500. Comparison of the two files 500 and 600 clearly illustrate the manner in which the test engine 206 writes the test results to the test history file 600.

Significantly, by having similar formats, the test history files 210 may be provided to the test engine 206 as inputs to repeat previously-performed tests procedures. For example, the user may repeat test procedures that detected errors after correcting the detected errors in order to insure that the errors have been properly corrected.

When repeating a previous test procedure, the test engine 206 provides the user with the option of re-executing the test procedure starting from the test case in a particular test procedure and going sequentially to the last. This capability is provided to the user through the user interface 209 in a well known manner. For example, the test engine 206 retrieves all of the test history files 210 from memory 108 associated with a particular test case and displays it on display 118 through, for example, a text editor. After modifications are made, the test engine 206 will then execute the test procedure sequentially starting from the selected test case. This ability to run each test procedure beginning from any test case enables the user to more quickly isolate the cause of an error.

As noted, the test engine 206 also records in the test history file 210 the elapsed time of each state transition. When repeating a previously-recorded test, the test engine 206 can use this time entry to execute the test in the same time as the original test was performed. This is done to aid in reproducing and debugging any errors that may have occurred during a previous execution of the test procedure. The present invention also allows the user to edit the test history file 210 in order to increase or decrease the time delay between each state to more closely simulate the actual operation of the software program 104. For example, if the software program 104 receives a series of user inputs, applying such inputs in rapid succession within a second may cause unanticipated behavioral problems that will not occur during normal operations. If such problems are suspected, then a delay may be added to the test history file 210 or through the user interface 209 to cause the simulated user's response to more accurately reflect human behavior and the test procedure can be repeated.

C. Test Functions

FIG. 7 is a source code listing of an exemplary test function 700. This "unloadNLM" test function 700 is identified on line 30 of the test specification file 500 illustrated in FIG. 5. Briefly, the test function 700 determines whether a software module (a NetWare Loadable Module or NLM; NetWare is a registered trademark of Novell, Inc.) may be successfully unloaded. As shown on lines 24–38, an indication of whether the software program 104 successfully completed this function 212 of unloading the NLM software module is determined by values and or conditions set by the program 104. The results of the test procedure are provided to the test engine 206 through returnValue as shown on lines 11 and 30. As noted, the test functions 202 are software program-specific test procedures or sub-procedures that test specific discrete functional components 212 of the software program 104. A significant advance over the conventional automated test systems is the division of the software program 104 into discrete components, each of which may be tested separately by an associated test function 202, the application of which is determined by the user-generated test specification file 210. Test functions 202 in general are described in further detail below.

D. Test Engine

Figure 8:
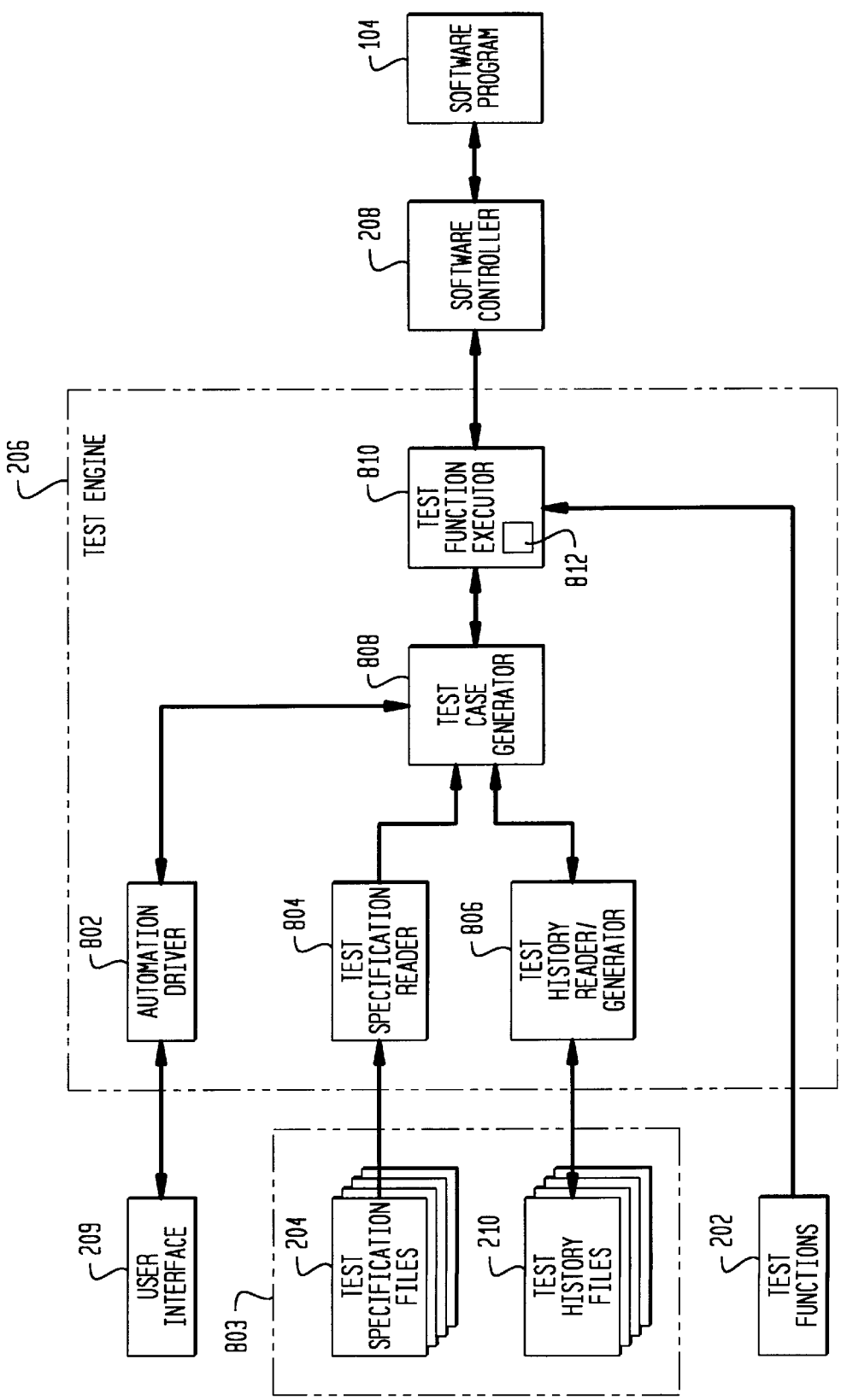
FIG. 8 is a functional block diagram of one embodiment of the test engine incorporated in the test automation system of the present invention.

FIG. 8 is a functional block diagram of a preferred embodiment of the test engine 206 of the test automation system 102. The test engine 206 includes a test case generator 808 that determines all possible and desired test cases, including state transitions and input values, to verify the software program 104. The test engine 206 generates these test cases based upon the state definitions provided in the user-created test specification files 204.

A test function executor 810, responsive to the test case generator 808, executes or applies the test functions 202 to the software program 104 through the conventional software controller 208. The test case generator 808 instructs the test function executor 810 to execute a specific test function 202 at a specific time to advance the software program 104 from a current state to the next at a predetermined rate. The test function executor 810 reads the test functions 202 and arranges them in a function table 812. The test function executor 810, in response to instructions received from the test case generator 808, executes a specific test function 202 in the function table 812. Upon executing each of the test functions 202, the test function executor 810 informs the test case generator 808 whether or not the software program 104 successfully executed the state transition. The test function executor 810 uses the software controller 208 to exercise the software under test 104. The results of the implemented test function are returned from the software controller 208 to the test function executor 810, which in turn forwards the results to test case generator 808.

As noted, the user controls the test environment. This control is effected through an automation driver 802. The automation driver 802 interfaces with the creator of the test specification files 204 through user interface 209 which provides information on display 118 and receives user inputs through input devices 116. The automation driver 802 provides the test case generator 808 with user-generated instructions. The instructions include which type of test to perform (e.g., basis path test, range test, etc.), the speed at which the selected tests are to be executed, and whether or not destructive tests are permitted. Other user/operator control instructions are also contemplated based upon the type of test the test case generator 808 is to perform and the type of information contained in the test specification files 204.

A test specification reader 804, in response to the test case generator 808, accesses the test specification files 204 and provides a specified test specification 204 to the test case generator 808. Similarly, a test history reader/generator 806 accesses the test history files 210. As noted, the test specification files 204 and the test history files 210 are preferably text files. Such files may reside in the same storage location, such as memory 108 and/or disk storage 114, as illustrated by dashed box 803.

The test case generator 808 determines the possible paths through the software program 104 based upon the contents of the test specification file 204. Importantly, the test case generator 808 does not provide any test- or program-specific functions. All such functionality is provided in the test functions 202, test specification files 204 and test history files 210. Thus, the test case generator 808 is responsive to the test specification files 204 and the test history files 210. The test case generator 808 controls the test specification reader 804 and test history reader/generator 806 to read their respective files 204, 210 and controls the test function executor 810 in response to the contents of these files.

The test function executor 810 reads test functions 202 and arranges them in a function table 812. Once the test case generator 808 has determined the next state, it verifies that the test function executor 810 has the correct test function in its function table 812. Each test function 202 is then called when the test case generator 808 is ready to execute the next test function 202. The function executor 810 uses the software controller 208 to exercise the software program 104. The results of the function test are returned from the software controller 208 to the test function executor 810, which in turn forwards the results to the test case generator 808.

Figure 9:
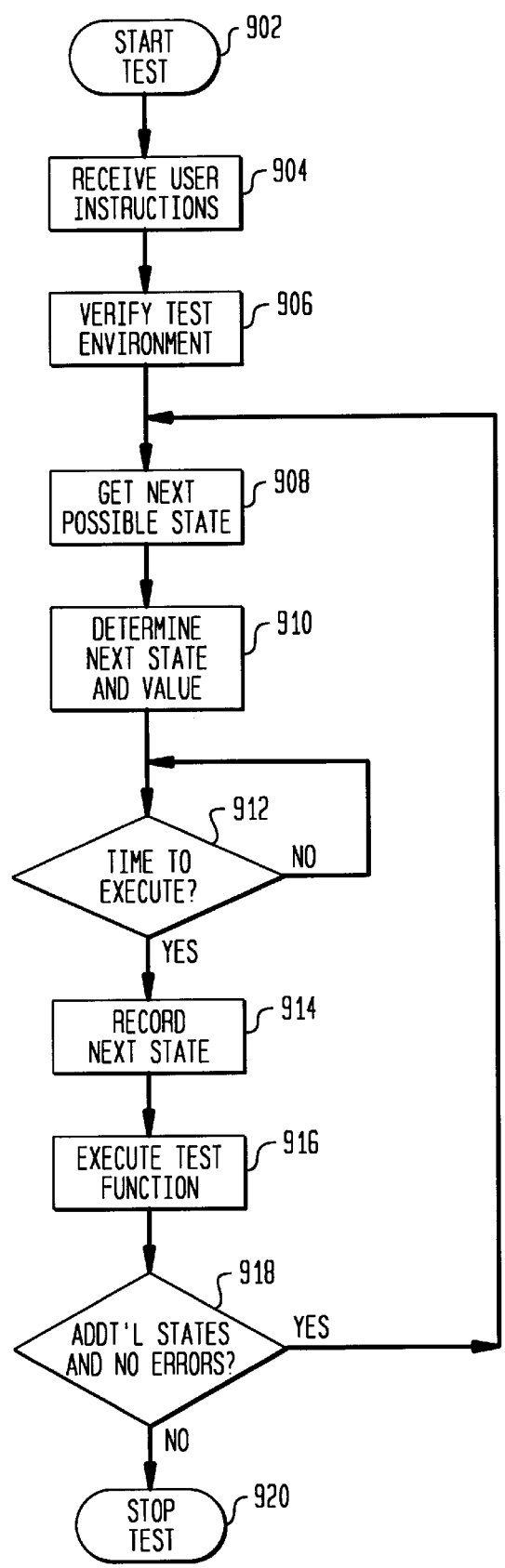
FIG. 9 is a flow diagram illustrating the functions performed by the test case generator of the present invention.

The functions performed by the components of the test engine 206 are described next with reference to the flowchart illustrated in FIG. 9. After start block 902 the user/operator, through the user interface 209, invokes the test automation system 102 to execute a desired test of a software program 104 at block 904. The user also specifies whether a previously-executed test should be performed.

At block 906 the appropriate file is verified as being available to the test engine 206. If the user wishes to run a previously-executed test, then the test case generator 808 requests the test history reader/generator 806 to access the test history files 210 to verify the presence of the specified test history file. Likewise, if the user wishes to run a new test, then the test case generator 808 requests the test specification reader 804 to access the test specification files 204 to verify access to the specified test specification file. Also, the test case generator 808 verifies that the desired software program 104 is under the control of the software controller 208.

The test specification and history file readers 804 and 806 are operational throughout the test procedure. At block 908, the test case generator 808 requests from the appropriate reader 804, 806 for the next possible state. As noted, the test specification file 204 contains, for each possible current state, all possible states that may follow from that current state.

Thus, if the user indicated that a previously-executed test is to be performed, then the test case generator 808 requests the next state from the test history file reader 806. Since the test history file contains actual state transitions, test history reader/generator 806 provides a single next state to the test case generator 808.

If the user indicated that a new test is to be performed, then the test case generator 808 requests the next possible states from the test specification file reader 804. The test case generator 808 provides the test specification reader 804 with user-provided instructions to consider in making its determination of which possible next states to provide to the test case generator 808. For example, if the user instructed that only nondestructive tests are to be performed, then this information would be provided to the test specification reader 804 which will then provide only such possible next states to the test case generator 808.

The test case generator 808 then determines which of the next possible states is to be transitioned to at block 910. This determination is primarily based upon the type of test that the user indicated is to be performed. For example, if the test automation system 102 has been instructed to perform a previous test, then the test case generator 808 performs the next state provided by the test history reader 806 since a previously-executed test has only one next state. The test history file record which was provided to the test case generator 808 also contains any values which must be executed with the test functions 202. Therefore, in this circumstance the test case generator 808 does not need to determine a value to input into the test function 202. The timing of the previously executed test which is also provided in the test history file record may be used by the test case generator 808 to reproduce the previously performed tests.

If the test automation system 102 has been instructed to perform a random test, then the test case generator 808 will randomly choose one of the possible next states. Referring to the example test file illustrated in FIG. 4, one of the Next States 404 defined in the state specification table 400 would be selected. In addition, the test case generator 808 will also randomly choose an input value for a test function 202. Referring again to the exemplary test specification file 400, the test case generator 808 would, for example, set the minimum file cache buffers at line 38 of test specification 500 to a random value between 20 and 100.

If the test automation system 102 has been instructed to perform a basis path test, the test case generator 808 starts from the first next state provided and verifies that all basis path tests have been performed for that next state. If there are more basis path tests to perform on that next state, then the test case generator 808 selects that next state. Otherwise, the test case generator 808 advances past that next state to and selects one of the following next states that has more basis path tests to perform. Once the next state is determined, then the value for the associated test function 202 is selected. In one aspect of the invention, when there is an entry in the Min and Max fields, the test case generator 808 chooses a value between the minimum and maximum values to use for the test function.

If the test automation system 102 has been instructed to perform a range test, the test case generator 808 begins with the first possible next state, and checks that all range tests have been performed for that next state. If there are more range tests to be performed on the next state, it will select that next state. Otherwise, the test case generator 808 will skip that next state and choose a state that has more range tests to perform. The test case generator 808 applies all values between the Test Min and Test Max values 416 and 418. In addition, the test case generator 808 tests values around the specified range for that value. In one preferred embodiment, the test case generator 808 provides the test function with values immediately above, immediately below and at the upper and lower threshold values. Other range test approaches are also contemplated.

Once the test case generator 808 has selected a next state, the test function 202 which is to be executed and the values which are to be applied, then the test case generator 808 waits until the appropriate time to implement this portion of the test procedure at block 912. As noted, the time may be provided in the test history files 210 or the user through the user interface 209. In an alternative embodiment, timing information may also be provided in the test specification file 204.

At block 914 the test case generator 808 writes the state, the next state and the test function 202 to a record on the test history file 210. This information is provided to the test history reader/generator 806, which formats the information appropriately for the test history files 210. The information may also be provided to the user through the user interface 209. For example, the information may be provided to the display 118 to indicate which discrete component 212 of the software program 104 is currently being tested.

In another embodiment, the test case generator 808 determines each possible next state and the test function 202 to be executed and writes this information to the test history file 210 for each state and each possible next state in order to create an entire history of the test procedure before execution. This insures that the test procedure does not corrupt the test history file 210.

The test function is executed at block 916. Here, the test case generator 808 invokes the test function executor 810 to execute the specified test function 202. The test function executor 810 retrieves the test function 202 from the function table 812 and applies it to the software program 104 through the controller 208 in a manner well known in the art.

This process is repeated for the additional basis path and range tests in the test specification file 204 as shown by block 918. Upon completion, testing ceases at stop block 920. As will be apparent to one skilled in the art, each test specification file 204 causes the test engine 206 to perform a test procedure which requires the execution of one or more paths through the software program 104. Each of these paths in turn require the execution of one or more test functions 202, many of which are executed one or more times during one or more paths. The execution of a test function 202 to cause a state transition is sometimes referred to as a test step. Thus, the test specification file 204 provides the parameters for one or more test procedures, each containing a number of test steps that cause the software program 104 to transition between states to define a test path through the software program 104.

Results of the application of the test function 202 are returned from the controller 208 to the test case generator 808 indicating success or failure. Since this information, along with every state, next state and corresponding test function is written by the test case generator 808 to the test history file 210, the user/operator can determine the exact location of the error by reviewing the test results.

An example of the operation of the test automation system 102 to perform a random path utilizing the test specification file 500, test history file 600 and test function 700 is described below. The test begins when the user/operator, through the user interface 209, invokes the test engine 206 to execute a random path test using the state specification file 500. First, the INIT state on line 3 executes with the "getServerEnvironment" test function. As noted, the INIT state is executed once at the beginning of the test procedure to set up the environment for the test.

The test case generator 808 then selects the START state on line 5 of the test specification file 500. The test case generator 808 instructs the test history reader/generator to write to a record of the test history file 210. As shown on line 3 of test history file 600, at time 0, the next state START was implemented to begin the test.

The Next State is the COMMON CONSOLE OPTIONS state. A "C" in the Prop(properties) field indicates that the COMMON CONSOLE OPTIONS state is a directly callable state. Therefore, the Current State, START, is put in the call stack. No function is executed in order to advance the software program 104 to the next state because the entry in the Function field is "doNothing." Thus, the software under test 104 automatically advances to the next state. Before doing so, the test case generator 808 instructs the test history reader/generator to write to a record of the test history file 210. As shown on line, at an elapsed time of 8.073024 microseconds, the next state COMMON CONSOLE OPTIONS was transitioned to with the performance of the test function doNothing with no argument or applied value.

The test specification reader 804 accesses the test specification file 500 and provides the test case generator 808 with the three next possible states shown on lines 8–10 of the test specification file 500. The test case generator 808 then randomly chooses one of them, such as line 10, and puts the COMMON CONSOLE OPTIONS in the call stack, due to the "C" in the properties field. As shown on line 10, the Next State in the path is the SET PARAMETERS state. Again, because "donothing" is in the test function shown on line 10, no test function is to be executed to advance to the next state.

The test case generator 808 instructs the test history reader/generator to write to a record of the test history file 210. As shown on line 5, at an elapsed time of 29.089779 microseconds, the next state SET PARAMETERS was transitioned to with the performance of no test function with no argument or applied value.

The SET PARAMETERS state has four possible next states as shown on lines 36–39 of the test specification file 500. From the possible next states the test case generator 808 chooses line 38, which has a RETURN Next State 404. As shown on line 38, the test function "setMinFileCache-Buffers" is executed to advance the software program 104 to the RETURN Next State. This particular test function sets a numerical input value for the minimum file cache buffers. As shown in FIG. 5, for this test function, the Min Value 412 and Test Min Value 416 are both 20, and the Max Value 414 and Test Max Value 418 are both 100. Therefore, the test case generator 808 instructs the test function executor 810 to retrieve the setMinFileCacheBuffers test function from the function table 212 and execute it with a random value between 20 and 100.

The test case generator 808 instructs the test history reader/generator to write to a record of the test history file 210. As shown on line 6, at an elapsed time of 54.904705 microseconds, the next state RETURN was transitioned to with the performance of the setMinFileCacheBuffers test function with an applied value of 27.

Upon completion, the test case generator 808 returns to the COMMON CONSOLE OPTIONS. This is because the last state put on the call stack was the COMMON CONSOLE OPTIONS state. Therefore, that state is taken off of the call stack and used for the Next State when the RETURN state is indicated.

Upon returning to the COMMON CONSOLE OPTIONS state, the test case generator 808 randomly selects line 9, the RETURN next state causes the test case generator to advance to the prior state in the call stack, which is the START state. Before doing so, the test case generator 808 instructs the test history reader/generator to write to a record of the test history file 210 as shown on line 7 of test history file 600.

Returning to the START state, the test case generator 808 randomly selects line 6. The test case generator 808 then instructs the test function executor 810 to execute the loadNLM test function with the argument Vrepair.NLM. The execution of this test function advances the software program 104 to the LOADED next state.

The test case generator 808 then randomly selects line 12. After the test function executor 810 executes the exitVRepair test function, the path is complete, since line 12 indicates the END next state. The test case generator 808 then creates a new path starting with the START state. Before doing so, the test case generator 808 instructs the test history reader/generator to write to a record of the test history file 210 as shown on line 9 of test history file 600.

Another feature of the present invention is that calls are supported. This means that a sequence of states can be grouped and called by a single state definition. The C entry in the Prop column 406 in the test specification 400 instructs the test case generator 808 to call the Next State 404 sequence for execution on the software program 104. This is advantageous because most software programs have series of state transitions which frequently occur in sequence in the normal operation of the software program. By establishing such sequences to be called, the complete sequence can be tested by reference to one state definition. For example, a sequence may include the states of selecting the file menu option, then selecting "exit", and then confirming that the exit occurred. The ability of several state transitions and test functions to be executed in sequence insures that common sequences are tested and reduces the amount of time required in the generation of the state definitions.

Furthermore, the test automation system can also be configured so that certain states of the software program 104 are weighted. This allows more common states to be executed first or more often during random tests. Weighting states insures that more common or important states of the software program 104 are thoroughly tested.

Figure 10:
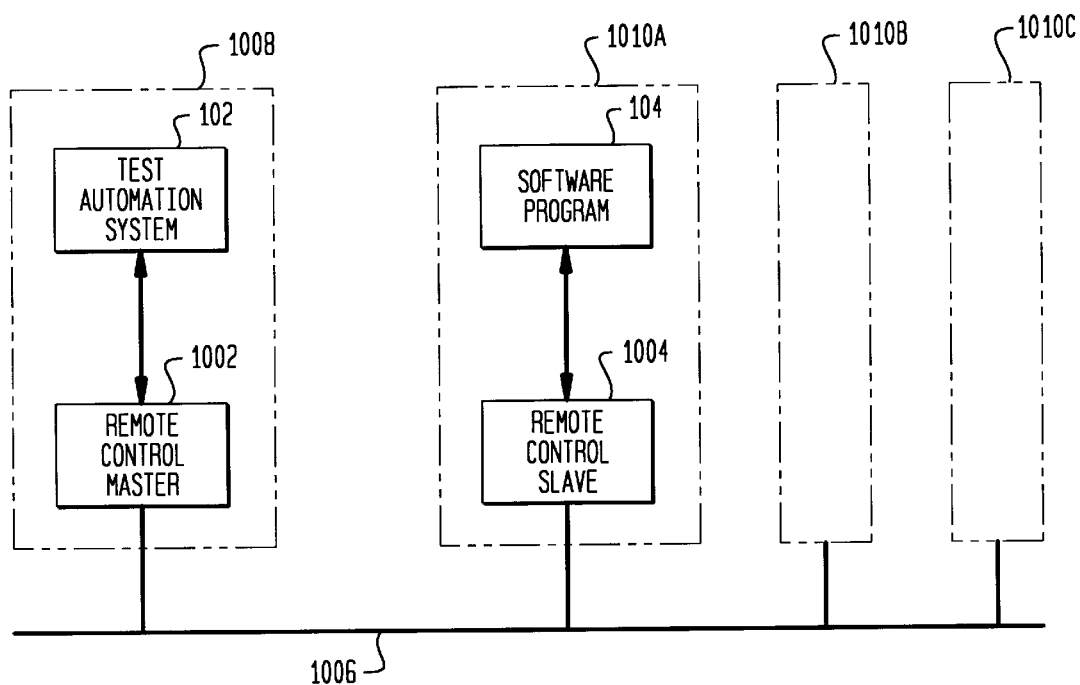
FIG. 10 is a block diagram illustrating an alternative embodiment of the present invention implemented in a distributed network.

The test automation system 102 need not reside on the same computer platform that the software under test 104. For example, referring to FIG. 10, the test automation system 102 may be on a computer platform 1008 while the software program 104 resides on another computer platform 1010A. The computers may be, for example, server and client nodes in a network 1006.

In this illustrative embodiment, the software controller 208 includes a remote control master 1002 and a remote control slave 1004. The remote control master 1002 communicates with the remote control slave 1004 over a network 1006. Multiple computer platforms 1010 can be tested to stimulate network computing.

The remote control master 1002 controls the operations of the test automation system 102 while the remote control slave 1004 controls the operations of the software under test 104. The remote control master and slave may be, for example, a commonly available software control package available from Novell, Inc. under the name Ncontrol™.

While various embodiments of the present invention have been described above, it should be understood that they have been presented by way of example only, and not limitation. Thus, the breadth and scope of the present invention are not limited by any of the above-described exemplary embodiments, but are defined only in accordance with the following claims and their equivalents.

What is claimed is:

1. A computer based test automation system for functionally testing a software program, comprising:

at least one test function, each configured to test and associated with a discrete functional component of the software program;

at least one user-defined test specification file containing state definitions associated with the software program, said state definitions defining which of said at least one test function the test engine must execute to advance the program from a state to a next state after each of said at least one test function is successfully completed; and a test engine configured to perform a test procedure in accordance with said at least one test specification, said test procedure including the execution of one or more of said at least one test function.

2. The system of claim 1, wherein said at least one test specification file is implemented in a text file accessible to said test engine.

3. The system of claim 1, wherein said state definitions of said at least one test specification file comprises:

one or more states that the software program may possess;

for each of said one or more states, one or more potential next states, each defining a state transition; and for each of said one or more state transitions, a pointer to one of said at least one test function that causes said state transition.

4. The system of claim 3, wherein said test engine provides a user with a test history of said test procedure, said test history comprising:

each of said one or more states that the software program possessed during said test procedure; and which of said at least one test function caused the software program to transition to each of said one or more next states.

5. The system of claim 4, wherein said test history is implemented in a text file accessible to said test engine.

6. The system of claim 4, wherein said test engine comprises:

a test function executor configured to execute said at least one test function, said test function executor operating with a software controller to control execution of the software program; and a test case generator configured to cause, in accordance with said at least one test specification, said test function executor to execute a specific one or more of said test functions to cause said state transitions in the software program.

7. The system of claim 6, wherein said test engine further comprises:

a test specification file reader for reading said at least one user-created test specification file in response to requests from said test case generator.

8. A computer based system for functionally testing a software program, comprising:

a plurality of user-defined test function means for testing associated discrete portions of the software program;

a plurality of test specification means for identifying functional state relationships of the software program, said specification means defining which of said plurality of test function means the test engine must execute to advance the program from a state to a next-state after each of said plurality of test function means is successfully completed; and test engine means for performing a test procedure in accordance with one of said test specification means to cause the execution of one of said plurality of test function means.

9. The system of claim 8, wherein each of said plurality of test specification means comprises:

one or more states that the software program may possess;

for each of said one or more states, one or more potential next states each defining a state transition; and for each of said one or more state transitions, a pointer to one of said one or more test functions that causes said state transition.

10. The system of claim 9, wherein said test engine means provides a user with results of said test procedure, said results comprising:

each of said one or more states that the software program possessed during said test procedure; and which of said plurality of test functions caused each state transition.

11. The system of claim 10, wherein said test engine means comprises:

test function executor means for executing said plurality of test function means, said test function executor means operating with a software controller to control execution of the software program; and test case generator means for causing, in accordance with said test specification means, said test function executor means to execute a specific one or more of said test function means to cause said state transitions in the software program.

12. A computer based test engine for performing test procedures on a software program, said program having a plurality of states, the test engine comprising:

test function executor means for executing user-created test functions on discrete functional components of said program, each of said test functions being associated with one of said discrete functional components;

state definition input means for accepting user-created state definitions which define which of said test functions the test engine must execute to advance the program from a state to a next state after each of said test functions are successfully completed; and test case generation means for determining, when the program is in a first state, which of said plurality of states will be said next state;

wherein said test case generator means instructs said test function executor means which of said test functions to execute on the software program to advance the program from said first state to said next state.

13. The test engine of claim 12, wherein, upon executing each of said test functions on the software program, said test function executor means informs said test case generator means whether or not the software program successfully executed each of said test functions.

14. The test engine of claim 13, further comprising:

test history creator means, responsive to said test case generator means, for storing each state, each corresponding next state and each corresponding test function which advances the software program from each state to each next state, to a test history file.

15. The test engine of claim 14, wherein said test case generator means utilizes said test history files to instruct said test function executor means to perform previously-performed test procedures.

16. A method of testing software having a plurality of states, the method comprising the steps of:

a) receiving user-created test functions, each associated with and configured to test a predetermined discrete portion of the software program and to output results of said test;

b) receiving user-created state definitions, each of said state definitions including a current state, a next state and an identifier of at least one of said test functions which causes a transition of the software program from a current state to a next state after each of said test functions are successfully completed; and c) executing said at least one of said test functions to cause a transition of the software program from each of said current states to each of said next states.

17. The method of claim 16, further comprising the steps of:

d) writing each next state and test function executed to a test history file; and e) writing test-related information to said test history file.

18. The method of claim 17, further comprising the step of:

f) using said test history file to perform further testing of said software.

19. The method of claim 18, further comprising the step of:

g) recording, in said test history file, an elapsed time between each transition.

20. A computer program product comprising a computer readable medium having a computer program logic thereon for enabling a processor in a computer system to automatically perform tests on a software program, the computer system having a memory, accessible to said processor, in which is stored a test specification file containing state definitions associated with the software program, said software program having a plurality of states the product comprising:

test engine means for testing discrete portions of said software program in accordance with the test specification file, said test engine means performing a plurality of test functions on the software program, each of said test functions being associated with and testing one of said discrete portions of said software program, wherein, when each of said test functions are successfully performed, said software program transitions from a current state to a next state, wherein said test engine means determines whether said software program transitioned correctly.

21. The test engine of claim 15, further comprising:

means for testing said test functions prior to using said test functions to test the software program.

* * * * *